(12) United States Patent
Xu et al.

(10) Patent No.: US 8,569,194 B2
(45) Date of Patent: Oct. 29, 2013

(54) CATALYST COMPOSITION FOR POLYMERIZATION OF OLEFINS, POLYMERIZATION PROCESS USING THE SAME, AND METHOD FOR ITS PREPARATION

(75) Inventors: Wei Xu, Riyadh (SA); Syriac J. Palackal, Riyadh (SA); Atieh Abu-Ruqabah, Riyadh (SA); Maneet Muktibodh, Riyadh (SA); Bing Wang, Geleen (NL); Nicolaas Hendrika Friederichs, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 617 days.

(21) Appl. No.: 11/990,171

(22) PCT Filed: Aug. 11, 2006

(86) PCT No.: PCT/EP2006/008093
§ 371 (c)(1),
(2), (4) Date: Jul. 10, 2009

(87) PCT Pub. No.: WO2007/020077
PCT Pub. Date: Feb. 22, 2007

(65) Prior Publication Data
US 2010/0160581 A1    Jun. 24, 2010

(30) Foreign Application Priority Data
Aug. 17, 2005    (EP) .................................... 05017828

(51) Int. Cl.
*C08F 4/653* (2006.01)
*C08F 4/6592* (2006.01)

(52) U.S. Cl.
USPC ........... 502/113; 502/115; 502/152; 526/113; 526/114; 526/160; 526/165; 526/943

(58) Field of Classification Search
USPC .......... 502/113, 115, 152; 526/113, 116, 160, 526/165, 943, 114, 348
See application file for complete search history.

(56) References Cited

U.S. PATENT DOCUMENTS

| 6,051,525 | A  | * | 4/2000 | Lo et al. ......................... 502/113 |
| 6,262,195 | B1 |   | 7/2001 | Dall'Occo et al. |
| 6,342,622 | B1 | * | 1/2002 | Arts et al. ......................... 556/53 |
| 6,673,880 | B2 | * | 1/2004 | Schaverien et al. ............ 526/113 |
| 7,199,195 | B2 | * | 4/2007 | Barry et al. .................... 526/114 |

FOREIGN PATENT DOCUMENTS

| JP | 07-048408 | 2/1995 |
| JP | 07-173208 | 7/1995 |

OTHER PUBLICATIONS

International Search Report; International Application No. PCT/EP2006/008093; International Filing Date: Aug. 11, 2006; Date of Mailing: Jan. 4, 2007; 3 Pages.
Written Opinion of the International Searching Authority; International Application No. PCT/EP2006/008093; International Filing Date: Aug. 11, 2006; Date of Mailing: Jan. 4, 2007; 4 Pages.

* cited by examiner

*Primary Examiner* — Caixia Lu
(74) *Attorney, Agent, or Firm* — Cantor Colburn LLP

(57) ABSTRACT

The present invention relates to a supported catalyst composition for polymerization of olefins comprising at least two catalytic components; and a polymerization process using that catalyst composition; and a method for its preparation.

20 Claims, 1 Drawing Sheet

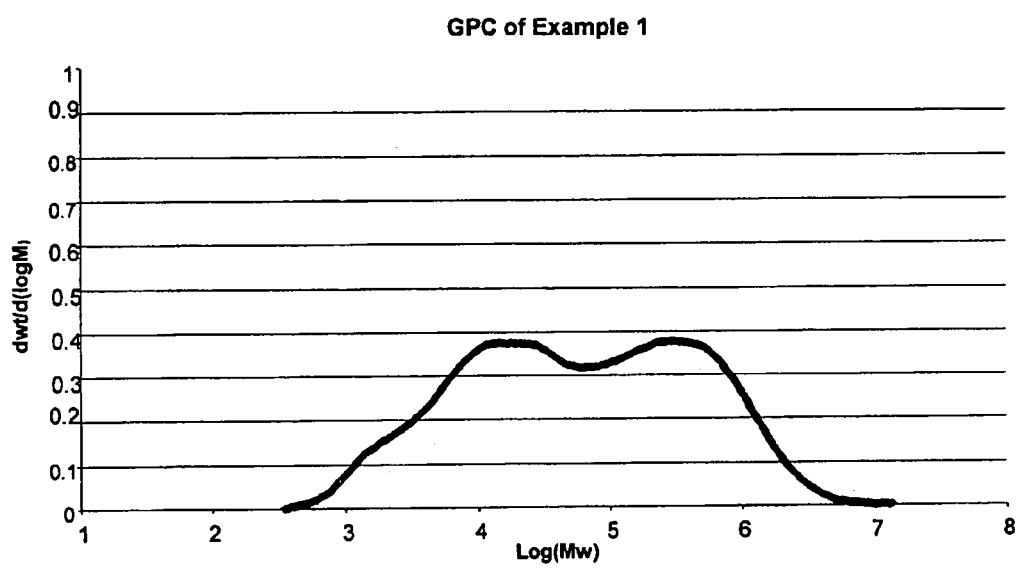

CATALYST COMPOSITION FOR POLYMERIZATION OF OLEFINS, POLYMERIZATION PROCESS USING THE SAME, AND METHOD FOR ITS PREPARATION

The present invention relates to a catalyst composition for the polymerization of alpha-olefins as well as to a process for homopolymerization or copolymerization using that catalyst composition, and to a method for its preparation. Especially, the present invention relates to a catalyst composition for the (co)polymerization of alpha-olefins to produce polyolefins with bimodal or broad molecular weight distribution.

Polyolefins having a multi-modal or at least a broad molecular weight distribution attract attentions. Such polyolefins may be prepared utilizing bimetallic catalysts. Such bimodal resins have several advantages over normal (monomodal) polyolefins: for example, bimodal polyolefins are preferred because of improved physical properties for applications such as blow molding, injection molding, pipe and pressure pipe applications. Polymers having a multi-modal MWD are generally characterized by having a broad MWD, as reflected by gel permeation chromatography (GPC) curves.

Regularly, problems exist using such a bimetallic catalyst, especially in the gas phase to produce bi- or multi-modal resins in single reactor.

One problem is reactor sheeting associated with the metallocene components often used in the bimetallic catalyst. It is well known that these single-site catalyst systems have a tendency towards fouling and/or sheeting, particularly when they are supported on a carrier, and especially, when they are used in gas or slurry phase polymerization processes. These single-site catalysts are very active and often result in the generation of extreme local heat to the growing polymer particle. Then molten sheet may be formed in the reactor. Such fouling and/or sheeting in a continuous gas phase process can lead to the ineffective operation of various reactor systems, such as the cooling system, temperature probes and the distributor plate. These upsets can lead to an early reactor shutdown.

There are various methods for improving operability of such reactors including coating the polymerization equipment, injecting additives into the reactor, controlling the polymerization rate, particularly on start-up, and reconfiguring the reactor design. Many publications mentioned various methods for introducing an antistatic agent. Since the antistatic agent contains active protons which could have adverse effects on the single-site catalysts, it would be advantageous to have a method to introduce an agent which has the function to reduce fouling/sheeting tendencies without poisoning the catalytic components.

The second problem is the reversed order of comonomer incorporation capability of the components of the bimetallic catalyst. The most frequently used mixed catalyst system for bimodal resins is based on a metallocene and a Ziegler-Natta type catalyst. The Ziegler-Natta type catalyst is often employed to produce a high molecular weight fraction (HMWF) while the metallocene catalyst generates the low molecular weight fraction (LMWF). The LMWF can improve the processability of the polymer, while the final product retains the higher strength and durability of a HMWF resin. Better property improvements may be achieved if the comonomers are placed predominantly in the HMWF. However, most of metallocenes have much better comonomer incorporation capability than typical Ziegler-Natta type catalysts. Thus, using such bimetallic catalyst systems often leads to undesirable comonomer concentration in LMWF.

Additionally, due to the significant differences between the two catalysts (metallocene and Ziegler-Natta type catalyst), the segregation of the polymer during polymerization process often leads to reactor fouling and it is difficult to control its process and the product produced. Polymer particles produced from such catalyst systems are frequently not uniform in size.

It is an object of the present invention to provide a supported catalyst composition which overcomes the disadvantages of the prior art in a process for polymerization of alpha-olefins. Especially, a catalyst composition should be provided placing comonomer predominantly in the high molecular weight fraction and also reducing reactor fouling as well as polymer segregation.

Further it is an object of the present invention to provide a process for polymerization of alpha-olefins with excellent processability and product controls using the inventive catalyst composition in a single reactor. Additionally, the polymer obtained shall have a multi-modal or at least a broad molecular weight distribution obtained with high productivity.

Finally, it is an object to provide a method for the preparation of the inventive catalyst composition.

The first object is achieved by a catalyst composition for polymerization of olefins, comprising a) a catalytic metallocene component (A) of the formula (I)

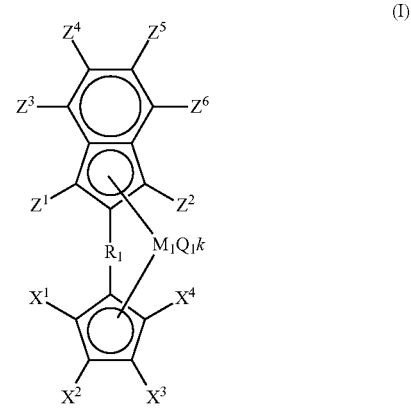

wherein: $M_1$ is a transition metal from the lanthanides or from group 3, 4, 5 or 6 of the periodic system of elements, $Q_1$ is an activatable ligand to $M_1$, k is the number of $Q_1$ groups and is equal to the valence of $M_1$ minus 2, $R_1$ is a bridging group and $Z^1$-$Z^6$ and $X^1$-$X^4$ are substituents, wherein $R_1$ is bonded to the indenyl group at the 2-position thereof, b) at least one catalytic Ziegler-Natta type transition metal component (B)

c) at least one activator, and d) support material.

Preferably, the first catalytic component (A) is of the formula (Ia)

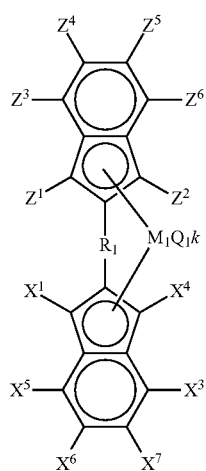

(Ia)

wherein $Z^1$-$Z^6$ and $X^1$ and $X^4$-$X^8$ are substituents and $R_1$ is bonded to the indenyl groups at the 2-position thereof.

In one embodiment, Catalyst $R_1$ is an alkylene-containing bridging group, an aryl-containing bridging group, a bisaryl-containing bridging group, or a silyl bridging group.

Preferably, $R_1$ is ethylene, propylene, phenylene, pyridyl, furyl, thiophyl, N-substituted pyrrol, biphenylen, diphenylsilyl or dimethylsilyl.

Most preferably, $R_1$ is 2,2'-biphenylene.

$M_1$ may be titanium, zirconium or hafnium, and $Q_1$ may be halogen or an alkyl.

Preferably, for the catalytic component (B) the transition metal is selected from group 3-10 of the periodic table of elements, preferably group 4, most preferably titanium.

The activator may be an organoaluminum compound and/or a non-coordinative ionic compound, preferably methyl aluminoxane (MAO), modified methylaluminoxane (MMAO), perfluorophenylborane, perfluorophenylborate derivatives, or mixtures thereof.

In one embodiment, the molar ratio of the activator relative to the catalytic component (A), in case an organo aluminum compound is selected as the activator, is in a range of from about 1:1 to about 1000:1, preferably about 50:1 to about 500:1 and wherein the molar ratio of the activator relative to the catalytic component (A), in case a non-coordinative ionic activator is selected, is in a range of from about 1:50 to about 50:1, preferably about 0.1:1 to about 20:1.

The support may be selected from the group consisting of silica, alumina, magnesia, titania, zirconia, clay, modified clay, zeolite, polystyrene, polyethylene, polypropylene, polyvinylchloride, polycarbonate, polyketone, polyvinyl alcohol, polymethyl methacrylate, cellulose, graphite or mixtures thereof.

The catalyst composition may additionally comprise modifiers, promoters, electron donor reagents, scavengers, silicon containing compounds, surfactants, antistatic reagents, antioxidants, and/or fluorine containing compounds, wherein preferably the antistatic reagent is at least an organic compound or a mixture containing at least one electron rich heteroatom selected from O, N, P or S, and a hydrocarbon moiety being branched or straight, substituted or unsubstituted.

In one embodiment, aluminum alkyl, such as triisobutylaluminum, trihexylaluminum, triisopropylaluminum, triethylealuminum, triethylaluminum, and reactants of these aluminum alkyls with various reagents, such as polar groups containing compounds of amines, imines, alcohols, phenols, hydroxylamines, sulfonates, antistatic/antifouling agents or the like, is added as scavenger or activator.

The second object is achieved by a process for homopolymerization or copolymerization of alpha-olefins using an inventive catalyst composition.

Preferably, the alpha-olefin is ethylene, propylene, butene, pentene, hexene, heptene, octene or mixtures thereof.

The process may be carried out in gas phase, slurry phase or solution phase, preferably at a temperature of about 50 to about 250° C.

The third object is achieved by a method for preparing an inventive catalyst composition, comprising the steps of:
(i) contacting a support material with an organomagnesium compound;
(ii) optionally contacting the magnesium treated support with an alkyl chloride, a silane chloride, an alcohol, an amine, a sulfonate, an antistatic agent or mixtures thereof;
(iii) contacting the magnesium-treated support with a transition metal component selected from the group 3-10 of the periodic table of elements, preferably group IV, most preferably titanium;
(iv) contacting the intermediate obtained in step (iii) with the catalytic metallocene component (A), optionally together with an activator; and
(v) optionally modifying the catalyst composition with an antistatic reagent in step (ii)-(iv), optionally in presence of an organoaluminum compound.

The metallocene component (A) in the catalyst composition of the invention is preferably an indenyl derivative as disclosed in U.S. Pat. No. 6,342,622 which is incorporated herein by reference in its entirety.

In detail, $Q_1$ may comprise one or more uni- or polyvalent anionic ligands to the transition metal $M_1$. As examples of such ligands, which may be the same or different, the following can be mentioned: a hydrogen, a halogen, an alkyl group, an aryl group, an aralkyl group, an alkoxy group, an aryloxy group, or a group with a heteroatom chosen from group 14, 15 or 16 of the Periodic System of Elements, such as an amine group, an amide group, a sulfur-containing compound or a phosphorous-containing compound.

$Q_1$ may be also a monoanionic ligand bonded to $M_1$ via a covalent metal-carbon bond and which is additionally capable to non-covalently interact with $M_1$ via one or more functional groups, for example 2,6-difluorophenyl, 2,4,6-trifluorophenyl, pentafluorophenyl, 2-alkoxyphenyl, 2,6-dialkoxyphenyl, 2-(dialkylamono)benzyl and 2,6-(dialkylamino)phenyl.

The number of $Q_1$ groups in the catalytic component (A) (index k in formula I) is determined by the valence of $M_1$ and the valence of the $Q_1$ group itself.

The substituents $X_1$-$X_8$ may be each separately hydrogen or a hydrocarbon radical with 1-20 carbon atoms, e.g. alkyl, aryl, aryl alkyl. Further, $X_1$-$X_4$ may be a halogen atom, or an alkoxy group. Also, two adjacent hydrocarbon radicals may be connected with each other in a ring system. In this way, an indenyl can be formed by connection of $X_1$ and $X_2$, $X_2$ and $X_3$, $X_3$ and $X_4$, or fluorenyl can be formed by connection of both $X_1$ and $X_2$ and $X_3$ and $X_4$. The substituent may also comprise one or more heteroatoms from group 14, 15 or 16 of the Periodic System of the Elements.

The substituents $Z_1$-$Z_6$ may each separately be a substituent as disclosed above with regard to the substituents X.

The term "Ziegler-Natta-type catalyst" is meant as encompassing traditional Ziegler-Natta catalysts which are commonly composed of a magnesium component and a transition metal component, with, optionally, an aluminum components and/or electron donors. Preferred transition metals may be selected from the groups 4 to 6 of the periodic table, wherein titanium-containing compounds are preferred.

It was found that with the catalyst composition according to the invention polymers may be produced having a multimodal or at least a broad molecular weight distribution, wherein the inventive catalyst composition provides a high activity and easy processability and final product control. No reactor fouling is observed during the polymerization run. For the preparation of copolymers, the catalytic component (B) produces high molecular weight polyolefins with high comonomer contents, wherein the catalytic component (A) produces low molecular weight polyolefins with low comonomer incorporations.

The catalytic component (A) will lead to less accessible active centers for comonomers after activation. Table 1 below gives some examples that demonstrate the better monomer selectivity of the metallocene in the catalyst composition than other commonly used metallocenes for the same purpose.

TABLE 1

Comonomer incorporation of different metallocenes

| Catalyst # | H2/C2 | C4/C2 | Polymer Amount (g) | B.D. (g/cc) | Mn | Mw | Mw/Mn | Density g/cc |
|---|---|---|---|---|---|---|---|---|
| EtInd2ZrCl2 | 0.005 | 0.05 | 256 | 0.29 | 16323 | 72002 | 4.41 | 0.9381 |
| Ind2ZrCl2 | 0.005 | 0.05 | 144 | 0.19 | 3859 | 18738 | 4.86 | 0.9448 |
| Ph2Ind2ZrCl2 | 0.005 | 0.05 | 207 | 0.29 | 9337 | 42298 | 4.53 | 0.9611 |

Ph2Ind2ZrCl2 = 2,2'-bis(2-indenyl)biphenylzirconiumdichloride

Therefore, resins produced according to the inventive process will have comonomer more effectively placed in the high molecular weight fraction.

The polymers produced according to the inventive process may be used in a wide variety of products and end use applications. Preferably, the polymers include polyethylene or copolymers of ethylene with alpha-olefin, and even more preferably include bimodal polyethylene produced in a single reactor.

The catalyst composition according to the invention may be used to make polyolefins, especially polyethylene, having a weight average molecular weight of 30000 or more, preferably 50000 or more, more preferably 100000 or more with an MWD ($M_w/M_n$) between 5 and 100, preferably between 8 and 50, more preferably between 10 and 40, with a flow index (FI, as measured at 190° C., 21.6 kg) of 0.1 g/10 min to about 100 g/10 min, a density of between about 0.91 and 0.97 g/cm$^3$. Preferably, the polymer is high density polyethylene.

The polyolefins obtained can be processed into films, molded articles (including pipes), sheets, wire and cable coating and the like. The films produced may further contain additives, such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, bariumsulfate, diatomaceous earth, wax, carbon black, flame retarding additives, low molecular weight resins, hydrocarbon resins, glass beads and the like.

EXAMPLES

The following examples are intended to be illustrative of this invention only. They are, of course, not to be taken in any way limiting on the scope of this invention. Numerous changes and modifications can be made without departing from the scope of the invention as disclosed in the accompanying claims.

In the accompanying drawing, FIG. 1 illustrates a GPC curve of the resin produced in polymerization example A1 below.

1. Experimental Conditions

All materials were handled in a nitrogen atmosphere using either schlenk techniques or nitrogen filled glove box. Nitrogen and isopentane were supplied from a plant source and were dried by an additional bed of molecular sieves, if necessary. All other solvents were first dried over molecular sieves and, if necessary, sodium/potassium amalgam. The catalysts were prepared under temperature control within 0.5° C. in silicon oil bath with stirring. Materials were used as received by the manufacturer unless otherwise noted.

2. Analysis of the Resin

The properties of the polymers produced in the Examples were determined as follows:

Flow Index: The Flow Index (FI, g/10 min, at 190° C. was determined according to ASTM D 1238 using a load of 21.6 kg.

Density: The density (g/cm$^3$) was determined according to ASTM D 1505-68 with the exception that the density measurement was taken 4 hours instead of 24 hours after the sample was placed into the density column.

Gel Permeation Chromatography (GPC): Polymer molecular weight and its distribution (MWD) were determined by Polymer Labs 220 gel permeation chromatograph. The chromatograms were run at 150° C. using 1,2,4-trichlorobenzene as the solvent with a flow rate of 0.9 ml/min. The refractive index detector was used to collect the signal for molecular weights. The comonomer distributions were determined by a FT-IR of Perkin Elmer Spectrum 1. The sample flow was split and approximately ⅔ of it passed to the FT-IR and ⅓ passed to the RI detector in parallel measuring mode. The software used for calculation is Cirrus from PolyLab for molecular weights from GPC and comonomer distributions from FT-IR. For calibration of the GPC a Hamielec type calibration with broad standard and a fresh calibration was used for each sample set. The FT-IR calibration is based on 10 samples of defined branching type and branching frequency, available form Polymer Labs.

3. Catalyst Preparation Examples

Under a dry nitrogen atmosphere, a Schlenk flask was charged with silica (30.00 g, Davison 955), previously calcined at 600° C. for 4 hours, and dibutylmagnesium (1M, hexane, 30 mmol) in isopentane (100 ml) was added to the silica to form a slurry. The slurry was kept at 75° C. for 1 hour. Then, all solvents were removed under vacuum. t-BuCl (60 mmol, molar ratio Mg:Cl=1:2) was added to the above solid to form a slurry. The flask was kept at 75° C. for 1 hour. Finally, isopentane solution of $TiCl_4$ (10 mmol) was added to form a slurry and the mixture was kept at 75° C. for 1 hour. Then, all solvents were removed under vacuum.

A solution prepared by combining 2,2'-bis(2-indenyl)biphenylzirconiumdichloride (0.150 g) with methylaluminoxane (MAO) (20 ml, 10% toluene) in toluene was added to the slurry. After stirring the resulting mixture at ambient temperature for about 0.5 hours, the liquid phase was removed by evaporation under vacuum at 50° C.

Then, a solution prepared by combining an antistatic reagent Atmer® 163 (0.3 g) and MAO (methylaluminoxane) (10 ml, 10% toluene) in toluene was added to the solid. After stirring the resulting mixture at ambient temperature for about 0.1 hours, the liquid phase was removed under vacuum at 50° C. to yield a free-flowing brownish powder.

4. BSR Polymerization Procedures

Slurry Process The supported catalyst as prepared under paragraph 3 was used to obtain ethylene homopolymers and copolymers of ethylene and 1-butene. The polymerizations were carried out in deoxygenated isopentane in a 2-liter stirred autoclave. Hydrogen was added to control molecular weight and a reactant of triisobutylaluminum (TIBAL) and amine was used as scavenger. Polymerizations were carried out at 95° C. and 20 bar of total pressure. Ethylene gas was delivered on demand to maintain the total pressure. Upon completion of the polymerization, the reaction was stopped, the reactor was vented and cooled to ambient temperature to recover the polymer. Details of each polymerization and characteristics of the resins produced are provided in Table 1 below.

Gas Phase Process: The polymerizations were carried out in a 2-liter autoclave equipped with a helical stir. Hydrogen was added to control molecular weight and a reactant of triisobutylaluminum (TIBAL) and amine was used as the scavenger. The polymerizations were carried out at 95° C. and 16 bar of total pressure. Ethylene gas was delivered on demand maintain this pressure. Upon completion of the polymerization, the reaction was stopped and the reactor was vented and cooled to ambient temperature to recover the polymer. Details of each polymerization and characteristics of the resins produced are provided in Table 2 below.

idized bed of reactor was made up of HDPE polyethylene granules. The reactor is passivated with an aluminum alkyl. During each run, ethylene streams and 1-butene comonomer was introduced before the reactor bed. The individual flows of ethylene, hydrogen and 1-butene comonomer were controlled to maintain target reactor conditions, as identified in each example. The concentrations of ethylene and 1-butene were measured by an on-line chromatograph. The examples 1 and 2 were samples taken from a 30 day polymerization run on a single gas phase fluidized bed reactor. In each polymerization run of the inventive examples, supported bimetallic catalyst was injected directly into the fluidized bed using purified nitrogen. Catalyst injection rates were adjusted to maintain approximately constant production rate. During each run, the reacting bed of growing polyethylene particles was maintained in a fluidized state by a continuous flow of the make-up feed and recycle gas through the reaction zone. As indicated in table 3, each polymerization run for the inventive examples utilized a target reactor temperature ("Bed Temperature"), namely, a reactor temperature of about 95° C. During each run, reactor temperature was maintained at an approximately constant level by adjusting up or down the temperature of the recycle gas to accommodate any changes in the rate of heat generation due to the polymerization.

TABLE 3

Process parameters corresponding to example 1 and 2 and polymer characteristics

| Process Parameter | | Example 1 | Example 2 |
|---|---|---|---|
| H2/C2 ratio | mole/mole | <0.001 | <0.001 |
| C4/C2 ratio | mole/mole | ~0.01 | ~0.01 |
| C2 partial pressure | bar | 9 | 9 |
| Tibal/amine | Kg/hr | 0.03 | 0.03 |
| Bed temperature | degree | 95 | 95 |
| Resin Properties | | | |
| $I_{21}$ | dg/min. | 3 | 1.5 |
| Mw | amu | 400,000 | 213,400 |
| Mn | amn | 20,000 | 26,800 |
| MWD | | 20 | 8 |

Electrostatic build up problems were substantially overcome on the pilot plant polymerization procedures.

The features disclosed in the foregoing description, in the claims and/or in the accompanying drawing may, both separately and in any combination thereof, be material for realizing the invention in diverse forms thereof.

TABLE 2

Polymerizations Results

| Catalyst Example # | Process | Qty. (mg) | Cocat. Aid/ scavenger | H2/C2 (mole) | C4 mL | time (min.) | Yield (g) | Prod. (gPE/g-Cat · h) | Mw | MWD | BF (/1000 C) | FI (190 C./21.6 Kg) | Density |
|---|---|---|---|---|---|---|---|---|---|---|---|---|---|
| A1 | slurry | 100 | TIBAL | 0.003 | 0 | 60 | 451 | 4,510 | 214,500 | 16 | — | 4.3 | 0.955 |
| A2 | slurry | 100 | TIBAL | 0.004 | 5 | 60 | 286 | 2,860 | 433,000 | 93 | 0.5 | 9.8 | 0.962 |
| A3 | slurry | 100 | TIBAL | 0.004 | 20 | 60 | 322 | 3,320 | 355,000 | 18 | 2.5 | 2.3 | 0.947 |
| B1 | GP | 50 | TIBAL/amine | 0.002 | 15 | 60 | 110 | 5,050 | 486,300 | 42 | — | — | — |
| B2 | GP | 50 | TIBAL/amine | 0.006 | 10 | 60 | 44.8 | 2,240 | 344,000 | 130 | — | 2.8 | 0.9589 |

BF/1000 C = branching frequency per 1000 carbons

5. Pilot Plant Polymerization Procedures

The following examples relate to gas phase polymerization procedures carried out in a fluidized bed reactor capable of producing polyethylenes at a production rate of ~10 Kg/hr in the presence of ethylene and 1-butene comonomer. The flu-

The invention claimed is:

1. A catalyst composition for polymerization of olefins, comprising a) a catalytic metallocene component (A) of the formula (I)

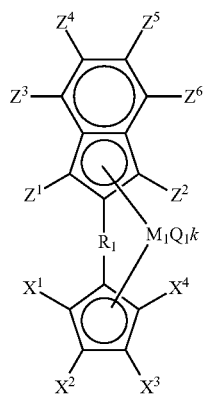

(I)

wherein: $M_1$ is a transition metal from the lanthanides or from group 3, 4, 5 or 6 of the periodic system of elements, $Q_1$ is an activatable ligand to $M_1$, k is the number of $Q_1$ groups and is equal to the valence of $M_1$ minus 2, $R_1$ is a bridging group and $Z^1$-$Z^6$ and $X^1$-$X^4$ are substituents, wherein $R_1$ is bonded to the indenyl group at the 2-position thereof, b) a catalytic Ziegler-Natta type transition metal component (B), c) an activator, and d) support material;

wherein a polymer formed using the catalyst composition has a high molecular weight fraction and a low molecular weight fraction, with comonomer predominantly in the high molecular weight fraction.

2. The catalyst composition according to claim 1, wherein the catalytic metallocene component (A) is of the formula (Ia)

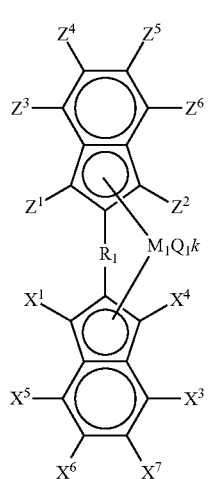

(Ia)

wherein $Z^1$-$Z^6$ and $X^1$ and $X^4$-$X^8$ are substituents and $R_1$ is bonded to indenyl groups at the 2-positions thereof.

3. The catalyst composition according to claim 1, wherein $R_1$ is an alkylene-containing bridging group, an aryl-containing bridging group, a bisaryl-containing bridging group, or a silyl bridging group.

4. The catalyst composition according to claim 3, wherein the alkylene, aryl, bisaryl or silyl is ethylene, propylene, phenylene, pyridyl, furyl, thiophyl, N-substituted pyrrol, biphenylen, diphenylsilyl or dimethylsilyl.

5. The catalyst composition according to claim 4, wherein the biphenylen is 2,2'-biphenylene.

6. The catalyst composition according to claim 1, wherein $M_1$ is titanium, zirconium, or hafnium.

7. The catalyst composition according claim 1, wherein $Q_1$ is halogen or an alkyl group.

8. The catalyst composition according claim 1, wherein for the catalytic component (B) the transition metal is selected from group 3-10 of the periodic table of elements.

9. The catalyst composition according claim 1, wherein the activator is an organoaluminum compound and/or a non-coordinative ionic compound.

10. The catalyst composition according to claim 9, wherein the activator is methylaluminoxane (MAO), modified methylaluminoxane (MMAO), perfluorophenylborane, perfluorophenylborate derivatives, or mixtures thereof.

11. The catalyst composition according to claim 1 wherein the molar ratio of the activator relative to the catalytic component (A), in case an organoaluminum compound is selected as the activator, is in a range of from about 1:1 to about 1000:1 and wherein the molar ratio of the activator relative to the catalytic component (A), in case a non-coordinative ionic activator is selected, is in a range from about 1:50 to about 50:1.

12. The catalyst composition according to claim 1, wherein the support is selected from the group consisting of silica, alumina, magnesia, titania, zirconia, clay, modified clay, zeolite, polystyrene, polyethylene, polypropylene, polyvinylchloride, polycarbonate, polyketone, polyvinylalcohol, polymethyl methacrylate, cellulose, graphite or mixtures thereof.

13. The catalyst composition according to claim 1, additionally comprising modifiers, promoters, electron donor reagents, scavengers, silicon containing compounds, surfactants, antistatic reagents, antioxidants, and/or fluorine containing compounds.

14. The catalyst composition according to claim 13, wherein the antistatic reagent is an organic compound containing an electron rich heteroatom selected from O, N, P or S, and a hydrocarbon moiety being branched or straight, substituted or unsubstituted.

15. The catalyst composition according to claim 13, wherein the scavenger or the activator is an aluminum alkyl chosen from the group consisting of triisobutylaluminum, trihexylaluminum, triisopropylaluminum, triethylaluminum, trimethylaluminum, or a reactants of triisobutylaluminum, trihexylaluminum, triisopropylaluminum, triethylaluminum, trimethylaluminum with polar groups containing compound reagent chosen from the group consisting of amines, imines, alcohols, phenols, hydroxylamines, sulfonates, and antistatic/antifouling agents.

16. A process for homopolymerization or copolymerization of alpha-olefins using a catalyst composition comprising a) a catalytic metallocene component (A) of the formula (I)

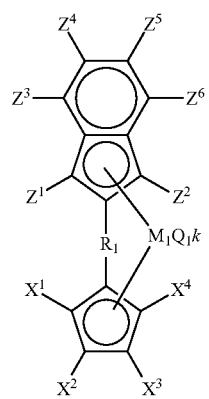

wherein: $M_1$ is a transition metal from the lanthanides or from group 3, 4, 5, or 6 of the periodic system of elements, $Q_1$ is an activatable ligand to $M_1$, k is the number of $Q_1$ groups and is equal to the valence of $M_1$ minus 2, $R_1$ is a bridging group and $Z^1$-$Z^6$ and $X^1$-$X^4$ are substituents, wherein $R_1$ is bonded to the indenyl group at the 2-position thereof, b) a catalyst Ziegler-Natta type transition metal component (B)
c) an activator, and
d) support material;
wherein a polymer formed using the catalyst composition has a high molecular weight fraction and a low molecular weight fraction, with comonomer predominantly in the high molecular weight fraction.

17. The process according to claim 16, wherein the alpha-olefin is ethylene, propylene, butene, pentene, hexene, heptene, octene or mixtures thereof.

18. The process according to claim 16, wherein the process is carried out in gas phase, slurry phase or solution phase.

19. The process according to claim 16, wherein the polymerization is carried out at a temperature of about 50 to about 250° C.

20. A method for preparing a catalyst composition comprising the steps of:
(i) contacting a support material with an organomagnesium compound;
(ii) optionally contacting the magnesium treated support with an alkyl chloride, a silane chloride, an alcohol, an amine, a sulfonate, an antistatic agent or mixtures thereof;
(iii) contacting the magnesium-treated support with a transition metal component selected from the group 3-10 of the periodic table of elements, preferably group IV;
(iv) contacting the intermediate obtained in step (iii) with a catalytic component (A) of the formula (I)

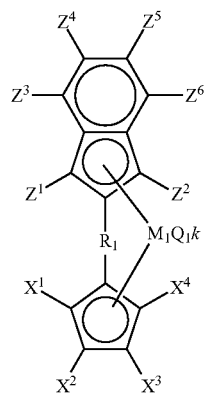

wherein: $M_1$ is a transition metal from the lanthanides or from group 3, 4, 5, or 6 of the periodic system of elements, $Q_1$ is an activatable ligand to $M_1$, k is the number of $Q_1$ groups and is equal to the valence of $M_1$ minus 2, $R_1$ is a bridging group and $Z^1$-$Z^6$ and $X^1$-$X^4$ are substituents, wherein $R_1$ is bonded to the indenyl group at the 2-position thereof, optionally together with an activator; and (v) optionally modifying the catalyst composition with an antistatic reagent in step (ii)-(iv), optionally in presence of an organoaluminum compound;
wherein a polymer formed using the catalyst composition has a high molecular weight fraction and a low molecular weight fraction, with comonomer predominantly in the high molecular weight fraction.

* * * * *